(12) United States Patent
Yu et al.

(10) Patent No.: US 6,809,840 B1
(45) Date of Patent: Oct. 26, 2004

(54) IMAGE PROCESSING METHOD FOR ADAPTIVELY SUB-SAMPLING AN IMAGE

(75) Inventors: Qing Yu, Rochester, NY (US); Jiebo Luo, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 826 days.

(21) Appl. No.: 09/603,490

(22) Filed: Jun. 23, 2000

(51) Int. Cl.[7] .......................... H04N 1/405; G06K 15/00
(52) U.S. Cl. ..................... 358/3.06; 358/3.15; 358/445; 358/3.08; 358/470; 382/232
(58) Field of Search ................................ 358/3.06, 447, 358/445, 467, 470, 3.04, 426.13, 3.13, 3.15, 3.19, 3.08, 3.24, 525; 348/392.1; 341/122; 382/252, 254, 266, 166, 232, 246, 300, 199

(56) References Cited

U.S. PATENT DOCUMENTS

| | | | | |
|---|---|---|---|---|
| 4,597,010 A | * | 6/1986 | Carr | 375/240.12 |
| 6,154,195 A | * | 11/2000 | Young et al. | 345/596 |
| 6,167,167 A | * | 12/2000 | Matsugu et al. | 382/283 |
| 6,169,766 B1 | * | 1/2001 | Aoki et al. | 375/240.16 |
| 6,704,123 B1 | * | 3/2004 | Av-Shalom et al. | 358/2.99 |

OTHER PUBLICATIONS

Lefebvre et al., "Prediction from Wrong Models: The Kriging Approach," *IEEE Antennas and Propagation Magazine*, vol. 38, No. 4, Aug. 1996, pp. 35–45.
Spaulding et al., "Methods for generating blue–noise dither matrices for digital halftoning," *Journal of Electronic Imaging*, Apr. 1997, vol. 6(2), p. 208.
R. Ulichney, Digital Halftoning, 1987, Massachusetts Institute of Technology.

* cited by examiner

*Primary Examiner*—Kimberly Williams
*Assistant Examiner*—Melanie Vida
(74) *Attorney, Agent, or Firm*—Thomas H. Close

(57) ABSTRACT

A digital image processing method for adaptively sub-sampling an image to X % of original pixels, includes the steps of generating an edge map of the image; normalizing the edge map to N-bits; applying a shift to the normalized edge map such that X % of the pixels will be ones when the normalized shifted edge map is halftoned using a blue noise halftoning technique; halftoning the edge map using the blue noise halftoning technique to generate a halftone mask; and sub-sampling the image at the pixel locations represented by ones in the halftone mask.

24 Claims, 2 Drawing Sheets

IMAGE PROCESSING METHOD FOR ADAPTIVELY SUB-SAMPLING AN IMAGE

FIELD OF THE INVENTION

This invention relates to the field of digital image processing, and more particularly to methods for adaptively sub-sampling an image.

BACKGROUND OF THE INVENTION

In many imaging applications, an image is sub-sampled such that only a part of the pixels of the original image, regularly or irregularly distributed on the image grid, are retained in order to reduce memory usage. Later on, in order to reconstruct the original image from these retained scattered image values, various interpolation methods may be employed to fill in the missing image values.

The most straightforward sub-sampling approach is the uniform sub-sampling scheme on a regular image grid. For example, we may divide the image into 4×4 cells, and only retain the image pixel at the right bottom corner of each cell to achieve the 4× sub-sampling, in which case, only approximately 6.25% of the original image pixels are retained. The benefit of uniform sub-sampling is that the positions of remaining pixels are known, and it is not necessary to track their coordinates. However, since uniform sub-sampling is an image independent scheme that takes no advantage of structures in a given image, images structures are not well preserved when a high sub-sampling ratio is required. For example, in the 4× sub-sampling case, where only around 6.25% of the original image pixels are retained, the resulting reconstructed image is usually not satisfactory.

There are many ways to take image content into consideration during sub-sampling. In general, fine sub-sampling is required in the neighborhood of sharp edge transitions, whereas coarse sub-sampling may be sufficient in relatively smooth regions. This approach is normally called the non-uniform sub-sampling. The image sub-sampling process is binary in nature, i.e., the value of each image pixel is either retained (sampled) or discarded. Non-uniform sub-sampling is similar in concept to digital halftoning.

Digital halftoning is a technique that is commonly used in digital image processing to create the appearance of intermediate tones when only two colorant levels are available (see R. Ulichney, "Digital Halftoning," MIT Press, Cambridge, Mass., 1987). Halftoning methods rely on the fact that an observer's eye will spatially average over some local area of the image so that intermediate gray levels can be created by turning some of the pixels "on" and some of the pixels "off" in some small region. The fraction of the pixels that are turned on will determine the apparent gray level.

One digital halftone technique employs a blue noise dither matrix M(m,n). M is typically a two dimensional array of W by W size (i.e., W is 128). For each pixel I(x,y) in a digital image, the x-y location of the pixel is used to determine the specific entry $M(x_d, y_d)$ in the blue noise dither matrix, where $x_d$ and $y_d$ are given by:

$$x_d = x \% W \text{ and } y_d = y \% W \quad (1)$$

Modular operators "%" are typically used since the size of the dither matrix is normally smaller than that of the image. I(x,y) is then compared with $M(x_d, y_d)$, and based on the result, the output pixel O(x,y) is either turned on or off. There are two advantages associated with blue noise dithering. First, it is a point comparison process, thus is fast to implement; second, it generates uniformly distributed dot patterns at slowly varying image areas, thus creating a pleasing appearance.

Although digital halftoning using a blue noise dither matrix is known in the art, it is not apparent how this technique could be used to perform non-uniform or adaptive sub-sampling.

There is a need therefore for an improved efficient method for adaptively sub-sampling an image that takes image content into consideration and has the advantages associated with blue-noise halftoning.

SUMMARY OF THE INVENTION

The need is satisfied according to the present invention by providing a digital image processing method for adaptively sub-sampling an image to X % of original pixels that includes the steps of generating an edge map of the image; normalizing the edge map to N-bits; applying a shift to the normalized edge map such that X % of the pixels will be ones when the normalized shifted edge map is halftoned using a blue noise halftoning technique; halftoning the edge map using the blue noise halftoning technique to generate a halftone mask; and sub-sampling the image at the pixel locations represented by ones in the halftone mask.

ADVANTAGES

The present invention has a main advantage that since image content is considered during the sub-sampling, the reconstructed image using a suitable reconstruction method (e.g. so-called Kriging method) will retain better fine details compared to that generated by uniform sub-sampling methods.

The present invention has yet another advantage in that an arbitrary sub-sampling ratio can be achieved within a small margin while it is usually hard for a uniform sub-sampling method to achieve certain sub-sampling ratios because the regular sample grid must fall on integer coordinates or a re-sampling procedure needs to be employed (re-sampling may introduce additional loss of image structures).

The present invention also has the advantage of efficiency and fast implementation speed. With the usage of a local variance operator, histogram analysis and blue noise halftone technique, only one scan of the original image is required as compared to other non-uniform sub-sampling methods normally using iterative scans of the original image to satisfy certain criterion such as the mean square error (MSE) of the reconstructed image.

DETAILED DESCRIPTION OF THE INVENTION

Figure 1:
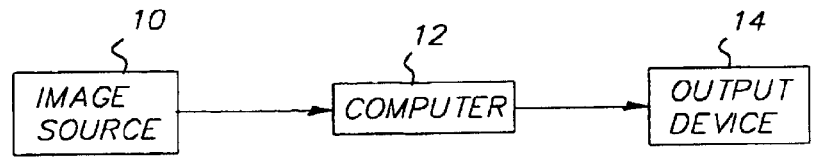
FIG. 1 is a block diagram showing an image processing system suitable for practicing the present invention.

The present invention may be implemented as a computer program in a digital image processing system having a digital computer. Referring to FIG. 1, a digital image processing system includes an image source 10, such as a digital camera, photographic film scanner, or a digital image memory device such as a picture CD and reader. The digital images from the digital image source 10 are processed according to the present invention in a digital computer 12, which can be a general purpose computer such as a PC, or a special purpose image processing computer that produces a subsampled image according to the present invention. The processed images are then delivered to an output device 14, such as a soft or hard copy display, or a digital image storage device. The processed images may also be transmitted over a communication network (not shown).

The image sub-sampling method of the present invention employs an image adaptive non-uniform sub-sampling algorithm utilizing a blue noise dither matrix $M(m,n)$. In the present invention, the edge map of an image is used as the input image to the halftone process to produce a halftone mask, which is then used for controlling the sub-sampling process.

Figure 2:
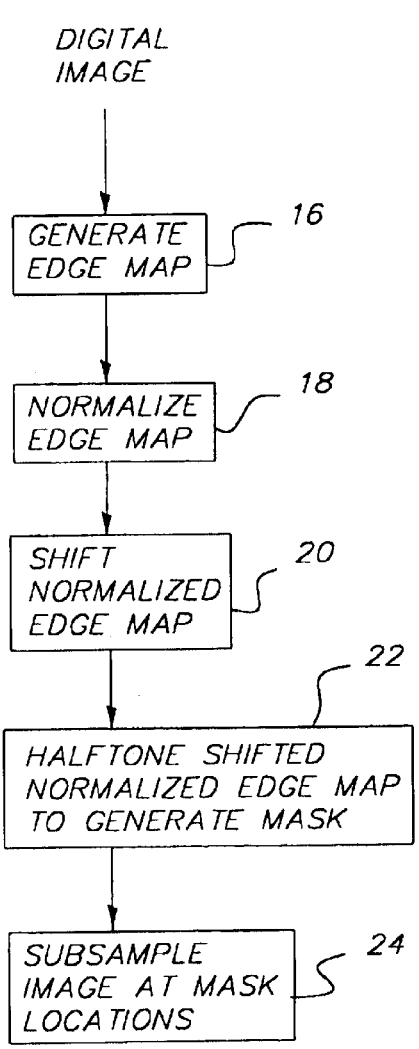
FIG. 2 is a flow chart illustrating the method of adaptive sub-sampling of an image according to the present invention.

Referring to FIG. 2, the digital image is processed by first generating an edge map 16. One way to generate the edge map 16 is to employ a local variance operator. For each image pixel $I(x,y)$, a local window can be defined, i.e., a 7×7 window with $I(x,y)$ in the center. Then, the edge map value $E(x,y)$ at x-y location is set as the variance of the image pixel values within that local window. Assuming that each value in the blue noise dither matrix $M(m,n)$ is an N-bit value, the edge map is further normalized 18 to N bits.

To allow an arbitrary sub-sampling ratio SR %, a shift is applied 20 to the normalized edge map such that SR % of the pixels will be ones when the normalized shifted edge map is halftoned using the blue noise dither matrix $M(m,n)$.

Let $H[i]$ ($0<=i<=255$ for 8 bit image) denote the histogram of the normalized edge map when the pixel values of the normalized edge map are rounded to integers. The total number of pixels, TotalOne, that will be ones when the normalized edge map is halftoned with a blue noise dither matrix, can be obtained approximately with the following equation:

$$TotalOne = \sum_{i=0}^{255}(i/255 * H[i]) \quad (2)$$

Subsequently, the achieved sub-sampling ratio ASR % is given by:

$$ASR\ \% = TotalOne/Width/Height, \quad (3)$$

where Width and Height are the dimensions of the image $I(x,y)$.

Thus, to achieve certain sub-sampling ratio SR %, $H[i]$ needs to be modified. The desired number of one pixels, $(TotalOne)_{desired}$, in the final halftone mask when the normalized shifted edge map is halftoned can be calculated as follows:

$$TotalOne_{desired} = Width * Height * SR\ \% \quad (4)$$

$(TotalOne)_{desired}$ is next compared with $(TotalOne)_{current}$, the number of one pixels in the halftone mask when the normalized edge map is halftoned. If $(TotalOne)_{current}$ is larger, then the normalized edge map should be shifted toward lower end of the tone scale, and vise versa. This procedure may be described best with the following pseudo computer codes:

```
step=0;
If ( (TotalOne)_current > (TotalOne)_desired)
{
    do
    {
        step--;
        H[0]+=H[1];
        for(i=1; i<255; i++)
            H[i]=H[i+1];
        H[255]=0;
        totalOn=0;
        for(i=1; i<255; i++)
            totalOn+=i/255*H[i];
    }
    while (totalOn > (TotalOne)_desired)
}
else if ((TotalOne)_current > (TotalOne)_desired)
{
    do
    {
        step++;
        H[255]+=H[254];
        for(i=254; i>0; i--)
            H[i]=H[i-1];
        H[0]=0;
        totalOn=0;
        for(i=1; i<255; i++)
            totalOn+=i/255 *H[i];
    }
    while( totalOn < (TotalOne)_desired)
}
for(i=0; i<Height; i++)
{
    for(j=0; j<Width; j++)
    {
        E[i][j]+=step;
        If(E[i][j]>255)
            E[i][j]=255;
        Else if(E[i][j]<0)
            E[i][j]=0;
    }
}
```

After the necessary shift is applied 20 to the normalized edge map, the normalized shifted edge map is halftoned 22 with the blue noise dither matrix $M(m,n)$ to generate a halftone mask $OE(x,y)$. The original image $I(x,y)$ is then subsampled 24 at the pixel locations represented by ones in the halftone mask $OE(x,y)$ to generate a subsampled image $S(x,y)$ using the following equation:

$$S(x, y) = \begin{cases} I(x, y), & \text{if } OE(x, y) > 0 \\ 255 & \text{else} \end{cases} \quad (5)$$

The subsampled image $S(x,y)$ will have approximately SR % pixels of the original image $I(x,y)$.

Figure 3:
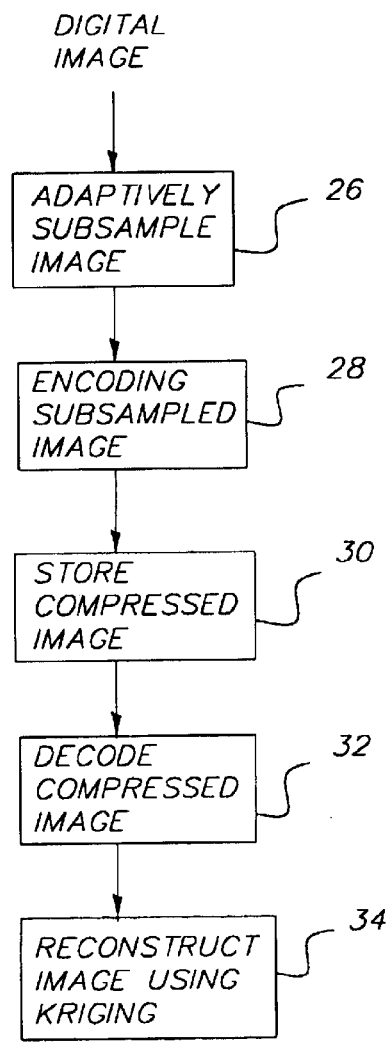
FIG. 3 is a flow chart showing image compression and reconstruction using adaptive sub-sampling according to the present invention.
Figure 4A:
FIGS. 4a–e compares an image that has been subsampled and reconstructed using a prior art non-adaptive sub-sampling technique and the method of the present invention.
Figure 4B:
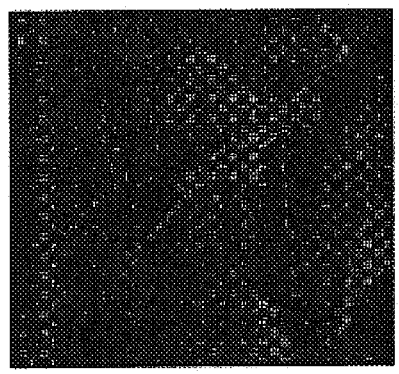
Figure 4C:
Figure 4D:
Figure 4E:

Referring to FIG. 3, the process of adaptively sub-sampling the image 26 (as shown by the steps in FIG. 2) can be applied in an overall process that includes the steps of compressing 28 the subsampled image $S(x,y)$ with runlength encoding followed with Huffman coding to generate a compressed subsampled image $CS(x,y)$. The compressed subsampled image $CS(x,y)$ can be either stored locally or transmitted to remote locations 30. The compressed subsampled image $CS(x,y)$ can later be decoded 32 to generate the subsampled image $S(x,y)$. The subsampled image $S(x,y)$ can be further used to restore 34 the digital image $I(x,y)$ approximately using a statistical interpolation such as the Kriging method.

Since the adaptive sub-sampling is not performed on a regular grid, conventional reconstruction methods such as interpolation do not apply. A statistical interpolation model known as Kriging has been used in several unrelated fields, such as marine science and meteorology where regular sub-sampling of the ground truth may not be possible or convenient (see J. Lefebvre et al, "Prediction from wrong models: The Kriging approach," IEEE Antenna and Propagation Magazine, Vol. 38, No. 4, August 1996). The image surface is modeled as the realization of a random function, which is assumed to be stationary of second order. Specifically, the first two moments are invariant by translations. The random function has a constant mean and covariance:

$$Cov(x_i, x_j) = \sigma^2 Corr(x_i, x_j) \qquad (6)$$

where $Corr(x_i, x_j)$ is the correlation between two pixels i and j located respectively on positions $x_i$ and $x_j$ of the image grid and $\sigma^2$ is the process variance. The Kriging process predicts unknown values from available data at known locations and acts like a weighting function. Each known data value is correlated with the point to be estimated. The correlation decreases with the distance from this unknown pixel. Based on a local interpolation, the stationary conditions of second order need to be satisfied, and the Kriging method is subsequently used. The unknown value is estimated using a weighted linear combination of the variable samples:

$$\hat{y}(x) = \sum_{i=1}^{n} \lambda_i y(x_i) \qquad (7)$$

where $\hat{y}(x)$ is the estimated value at location x; $\lambda_i$ (for i=1, ..., n) are weights associated to pixels $y(x_i)$ at locations $x_i$, and n is the number of nearest neighbors used for reconstruction of $\hat{y}(x)$. To avoid a systematic error, the mean of the prediction error, under stationary hypothesis, should be equal to zero to achieve an unbiased condition:

$$E\{\hat{y}(x) - y(x)\} = \sum_{i=1}^{n} \lambda_i E\{y(x_i)\} - E\{y(x)\} = m\left(\sum_{i=1}^{n} \lambda_i - 1\right) = 0 \qquad (8)$$

where m is the mean of y(x). The Best Linear Unbiased Predictor (BLUP) is obtained by choosing $\lambda_i$ (for i=1, ..., n) to minimize the MSE (mean squared error). As a result, the weights are obtained by resolving the following equations:

$$\begin{cases} \sum_{i=1}^{n} \lambda_i Cov(x_i, x_j) + \mu = Cov(x_j, x)), \forall j \\ \sum_{i=1}^{n} \lambda_i = 1 \end{cases} \qquad (9)$$

where $\mu$ is a Lagrange multiplier. Next, in order to determine the spatial covariance function over the local domain, a covariance function is estimated empirically from the available data as follows:

$$Cov(h) = 1 - \frac{1}{2N(h)} \sum_{k=1}^{N(h)} (y_k(x_i) - y_k(x_j))^2 \qquad (10)$$

where N(h) is the number of pixels pairs $y_k(x_i)$, $y_k(x_j)$ at positions $x_i$, $x_j$, separated by a distance $h = \|x_i - x_j\|$.

Referring to FIG. 4, images processed according to the prior art and according to the present invention are shown. FIG. 4a shows the original image. FIG. 4b is a 6.25% uniformly subsampled version of the original image, and FIG. 4c is a reconstructed version of the original image obtained from FIG. 4b using bicubic interpolation. FIG. 4d shows a 5% subsampled version of the original image obtained by the adaptive sub-sampling technique of the present invention, and FIG. 4e is a reconstructed version of the original image obtained from FIG. 4d by the method of Kriging interpolation. It can be seen by comparing FIGS. 4c and 4e that the method of the present invention provides a much higher quality reconstructed image even though the sub-sampling ratio was smaller.

The invention has been described with reference to a preferred embodiment. However, it will be appreciated that variations and modifications can be effected by a person of ordinary skill in the art without departing from the scope of the invention.

PARTS LIST 10 image source
12 computer
14 output device
16 generate edge map
18 normalize edge map
20 shift normalized edge map
22 halftone shifted normalized edge map to generate mask
24 subsample image at mask locations
26 adaptively subsample image
28 compressing subsampled image
30 store compressed image
32 decode compressed image
34 reconstruct image using Kriging method

What is claimed is:

1. A digital image processing method for adaptively sub-sampling a digital image having pixels to a sub-sampling ratio of SR %, comprising the steps of:

a) generating an edge map of the image;
   b) normalizing the edge map;
   c) applying a shift to the normalized edge map such that SR % of the pixels will be ones when the normalized shifted edge map is halftoned using a blue noise halftoning technique;
   d) halftoning the normalized shifted edge map using the blue noise halftoning technique to generate a halftone mask; and
   e) sub-sampling the digital image at the pixel locations represented by ones in the halftone mask to create a sub-sampled image.

2. The method claimed in claim 1, wherein said generating further comprises employing a local variance operator.

3. The method claimed in claim 1, further comprising the step of restoring the digital image from the subsampled image by Kriging technique.

4. The method claimed in claim 1, wherein the blue noise halftoning technique employs a blue noise dither matrix.

5. The method claimed in claim 4 wherein said normalizing is to the same bit value as said blue noise dither matrix.

6. The method claimed in claim 1, wherein the blue noise halftoning technique is an error diffusion technique.

7. The method claimed in claim 1, wherein the blue noise halftoning technique is a model based technique that produces blue noise.

8. The method claimed in claim 1, wherein the amount of shift applied to the normalized edge map is determined by generating a cumulative histogram of the normalized edge map according to the following equation:

$$TotalOne = \sum_{i=0}^{255}(i/255^*H[i]),$$

where TotalOne is the total number of pixel that will be ones when the normalized edge map is halftoned with a blue noise dither matrix, and H[i] is the histogram of the normalized edge map.

9. A method of compressing a digital image having pixels, the method comprising the steps of:
 a) generating an edge map of the image;
 b) normalizing the edge map;
 c) applying a shift to the normalized edge map such that an arbitrary sub-sampling ratio of the pixels will be ones when the normalized shifted edge map is halftoned using a blue noise halftoning technique;
 d) halftoning the normalized shifted edge map using the blue noise halftoning technique to generate a halftone mask;
 e) sub-sampling the image at the pixel locations represented by ones in the halftone mask to provide a subsampled image having said subsampling ratio; and
 f) and encoding the subsampled image.

10. The method claimed in claim 9, said generating further comprises employing a local variance operator.

11. The method claimed in claim 9, further comprising the steps of: decoding the subsampled image to provide a decoded subsampled image and restoring the digital image from the decoded subsampled image by Kriging technique.

12. The method claimed in claim 9, wherein the blue noise halftoning technique employs a blue noise dither matrix.

13. The method claimed in claim 9, wherein the blue noise halftoning technique is an error diffusion technique.

14. The method claimed in claim 9, wherein the blue noise halftoning technique is a model based technique that produces blue noise.

15. The method claimed in claim 9, wherein the encoding is a runlength coding followed by Huffman coding.

16. The method claimed in claim 9, wherein the amount of shift applied to the normalized edge map is determined by generating a cumulative histogram of the normalized edge map according to the following equation:

$$TotalOne = \sum_{i=0}^{255}(i/255^*H[i]),$$

where TotalOne is the total number of pixel that will be ones when the normalized edge map is halftoned with a blue noise dither matrix, and H[i] is the histogram of the normalized edge map.

17. A method for compressing a digital image having pixels to an arbitrary sub-sampling ratio, said method comprising the steps of:
 generating an edge map of the digital image;
 normalizing the edge map to provide a normalized edge map;
 applying a shift to the normalized edge map to provide a normalized shifted edge map;
 halftoning the normalized shifted edge map using a blue noise halftoning technique to generate a halftone mask having a percentage of pixels that are ones; and
 sub-sampling the digital image at the pixel locations represented by said ones in the halftone mask to provide a sub-sampled image;
 wherein said shift is such that said percentage is the same as said sub-sampling ratio.

18. The method claimed in claim 17, wherein said generating further comprises employing a local variance operator.

19. The method claimed in claim 17, further comprising restoring the digital image from the sub-sampled image by Kriging technique.

20. The method claimed in claim 17, wherein the blue noise halftoning technique employs a blue noise dither matrix.

21. The method claimed in claim 20, wherein said normalizing is to the same bit value as said blue noise dither matrix.

22. The method claimed in claim 17, wherein the blue noise halftoning technique is an error diffusion technique.

23. The method claimed in claim 17, wherein the blue noise halftoning technique is a model based technique that produces blue noise.

24. The method claimed in claim 17, wherein the amount of shift applied to the normalized edge map is determined by generating a cumulative histogram of the normalized edge map according to the following equation:

$$TotalOne = \sum_{i=0}^{255}(i/255^*H[i]),$$

where TotalOne is the total number of pixel that will be ones when the normalized edge map is halftoned with a blue noise dither matrix, and H[i] is the histogram of the normalized edge map.

\* \* \* \* \*